United States Patent [19]
Aubee

[11] Patent Number: 5,999,888
[45] Date of Patent: Dec. 7, 1999

[54] AUTOMATED CONTROL SYSTEM FOR MANAGING MULTIPLE ENERGY SOURCES

[75] Inventor: Thomas A. Aubee, North Kingstown, R.I.

[73] Assignee: Alternate Energy Corporation, Cumberland, R.I.

[21] Appl. No.: 08/871,201

[22] Filed: Jun. 9, 1997

[51] Int. Cl.$^6$ ...................................................... B67D 5/00
[52] U.S. Cl. ................. 702/45; 364/528.09; 364/528.17; 364/528.31; 702/50; 702/55; 222/57; 222/144.5
[58] Field of Search ............................ 364/528.17, 528.3, 364/528.31, 528.28, 528.21, 528.36, 528.11, 528.09, 528.1, 528.18, 528.37, 138, 141, 142, 143, 147, 187, 156, 479.12, 140.04, 140.06, 140.09; 222/52, 57, 63, 64, 144.5, 145.1, 145.7; 702/45, 50, 55, 100, 114, 150, 176–178, 188, 61; 307/34, 35, 38, 39, 40, 41, 153, 97, 64, 65; 705/412, 413; 701/99–105, 123; 123/431, 526, 574, 575, 577, 578; 431/18; 236/24, 46 R; 237/2 R; 137/551, 552.7, 553, 554, 560, 642.11; 340/870.02, 16, 870.28, 603, 606, 618, 825.06, 22, 825.72; 322/15

[56] References Cited

U.S. PATENT DOCUMENTS

| | | | |
|---|---|---|---|
| 3,919,623 | 11/1975 | Reuther | 322/15 |
| 4,218,744 | 8/1980 | Pratt et al. | 701/123 |
| 4,511,979 | 4/1985 | Amirante | 364/528.31 |
| 4,620,283 | 10/1986 | Butt et al. | 364/528.3 |
| 4,771,185 | 9/1988 | Fero N et al. | 307/34 |
| 4,976,144 | 12/1990 | Fitzgerald | 702/114 |
| 4,998,024 | 3/1991 | Kirk et al. | 307/40 |
| 5,092,305 | 3/1992 | Hing | 123/575 |
| 5,168,170 | 12/1992 | Hartig | 307/35 |
| 5,224,457 | 7/1993 | Arsenault et al. | 123/577 |
| 5,274,571 | 12/1993 | Hesse et al. | 364/528.26 |
| 5,355,854 | 10/1994 | Aubee | 123/431 |
| 5,424,958 | 6/1995 | Knupp | 705/412 |
| 5,432,710 | 7/1995 | Ishimaru et al. | 705/412 |
| 5,555,873 | 9/1996 | Nolen | 123/575 |
| 5,598,349 | 1/1997 | Elliason et al. | 364/528.3 |
| 5,598,863 | 2/1997 | Kruto | 137/624.11 |

*Primary Examiner*—Hal Wachsman
*Attorney, Agent, or Firm*—Barlow, Josephs & Holmes, Ltd.

[57] ABSTRACT

An automated control system for a dual-fuel boiler, engine, or other apparatus continuously monitors the consumption of a primary fuel source and automatically switches from the primary fuel source to a secondary fuel source when a predetermined amount of the primary fuel is used in a measured time period, the object of the system being to automatically maintain a 100% load factor of the primary fuel source. A meter continuously monitors consumption of the primary fuel and outputs an electronic flow signal representing consumption of primary fuel. The flow signal is received by a programmable logic controller having a real-time clock whereby consumption of the primary fuel is measured against time. Remote control actuated ball valves mounted in the primary and secondary fuel lines selectively control the flow of primary and secondary fuels to the dual-fuel apparatus. The programmable logic controller is programmed with a measured time period, and a 100% load limit of fuel consumed during the given time period. The programmable logic controller sums the flow signal over the measured time period and automatically controls switches from the primary fuel to the secondary fuel when the 100% load limit is achieved. When the measured time period expires, the logic controller reverts the system back to the primary fuel and starts the measured time period over.

8 Claims, 2 Drawing Sheets

AUTOMATED CONTROL SYSTEM FOR MANAGING MULTIPLE ENERGY SOURCES

BACKGROUND AND SUMMARY OF THE INVENTION

The instant invention relates to control systems for managing and controlling multiple energy sources.

Commercial, industrial and institutional consumers of energy commonly utilize multiple energy sources to minimize energy costs and ensure security and availability of their energy supply. For example, a predominantly natural gas consumer may store volumes of an alternate fuel, such as a diesel fuel or fuel oil, which may be used to fire process or heating equipment in the event that the gas supply is interrupted, or if the procurement costs of natural gas rises above that of the alternate fuel. Equipment at the facility is usually equipped with appropriate means for introducing either type of fuel to the equipment. Such equipment is usually referred to as a dual-fuel device.

With regard to fuel cost, the cost of a distributed energy source, such as electricity or natural gas, is often related to the stability of a customer's utilization of that fuel. For instance, a consumer of electricity often pays a "demand" charge which reflects the difference between his peak usage and base consumption of electricity. The demand charge is generally interpreted as a capacity charge paid by the consumer for excess capacity to be reserved for the few times it is utilized.

A similar premium rate structure typically exists for a natural gas customer who generates seasonal or process related peak rates of consumption which are significantly higher than their base consumption rates. The difference between a natural gas customer's peak and base consumption rates is typically referred to as a "load factor." A customer that consumes 1000 Mcf natural gas daily for the months of December, January, and February and then only 700 Mcf natural gas daily for the remaining nine months of the year would be determined to have a load factor of 70%. Based on a load factor of 70%, the customer's natural gas procurement cost might be $5.00/Mcf. If the customer's load was stable all year round at 700 Mcf daily consumption, the load factor would be 100% and the customer's natural gas procurement cost could drop to $3.80/Mcf. The reasons for the difference in cost is that the supplier of the natural gas can predict his customer's consumption more accurately which, in turn, allows him to purchase, and subsequently supply relatively precise volumes of gas at "firm rates", and therefore, demand charges are minimized. Natural gas consumers are thus becoming increasingly more aware of the benefits that can be realized by managing their load factors more efficiently.

The instant invention provides an automated control system for monitoring a primary fuel source of a dual-fuel apparatus, and for automatically switching from the primary fuel source to a secondary fuel source when a predetermined amount of the primary fuel is used in a measured time period, the object of the invention being to automatically maintain a 100% load factor of the primary fuel based on the measured time period. The control system generally includes a meter mounted in the primary fuel line for continuously monitoring consumption of the primary fuel and for outputting an electronic flow signal representing consumption of primary fuel. The flow signal is received by a programmable logic controller having a real-time clock whereby consumption of the primary fuel is measured against time. The control system further includes remote control actuated valves mounted in the primary and secondary fuel lines for selectively controlling the flow of the primary and secondary fuels to the dual-fuel apparatus. The programmable logic controller is programmed with a set of control parameters, including a measured time period, and a 100% load limit of fuel consumed during the given time period. The programmable logic controller sums the flow signal over the 24 hour period and automatically controls actuation of the first and second valves to switch from the primary fuel to the secondary fuel when the 100% load limit is achieved. When the 24 hour time period expires, the logic controller actuates the valves to revert back to the primary fuel and starts the measured time period over. The present system thereby provides the ability to automatically maintain a consistent daily use of the primary fuel source.

In the preferred embodiment as described in detail herein, the control system is utilized in connection with a dual-fuel steam boiler, wherein the primary fuel is natural gas, and the secondary fuel is fuel oil. The meter is operative for measuring natural gas flow and generates a scalable pulse-train signal which is generated proportionately with gas consumption. The programmable logic controller is utilized to receive and sum over a 24 hour period the volume proportional pulse-train signal emitted by the gas meter. When the time based volume of gas has reached a predetermined load limit, the flow of gas to the boiler is stemmed by closing the valve in the primary gas line, while a flow of oil is initiated by opening the valve in the secondary oil line. The boiler then operates on the fuel oil until a new period of measurement is initiated, or until the system is manually overridden. The system then reverts back to natural gas fuel when the new measured time period commences.

Accordingly, among the objects of the instant invention are: the provision of an automated control system for managing multiple energy sources to maintain a 100% percent load factor of a primary fuel source; the provision of an automated control system for monitoring a primary fuel source and for automatically switching from the primary fuel source to a secondary fuel source when a predetermined amount of the primary fuel is used in a measured time period; and the provision of such a control system which is particularly useful in connection with the management of natural gas consumption rates.

Other objects, features and advantages of the invention shall become apparent as the description thereof proceeds when considered in connection with the accompanying illustrative drawings.

BRIEF DESCRIPTION OF THE DRAWINGS

In the drawings which illustrate the best mode presently contemplated for carrying out the present invention.

DESCRIPTION OF THE PREFERRED EMBODIMENT

Figure 1:
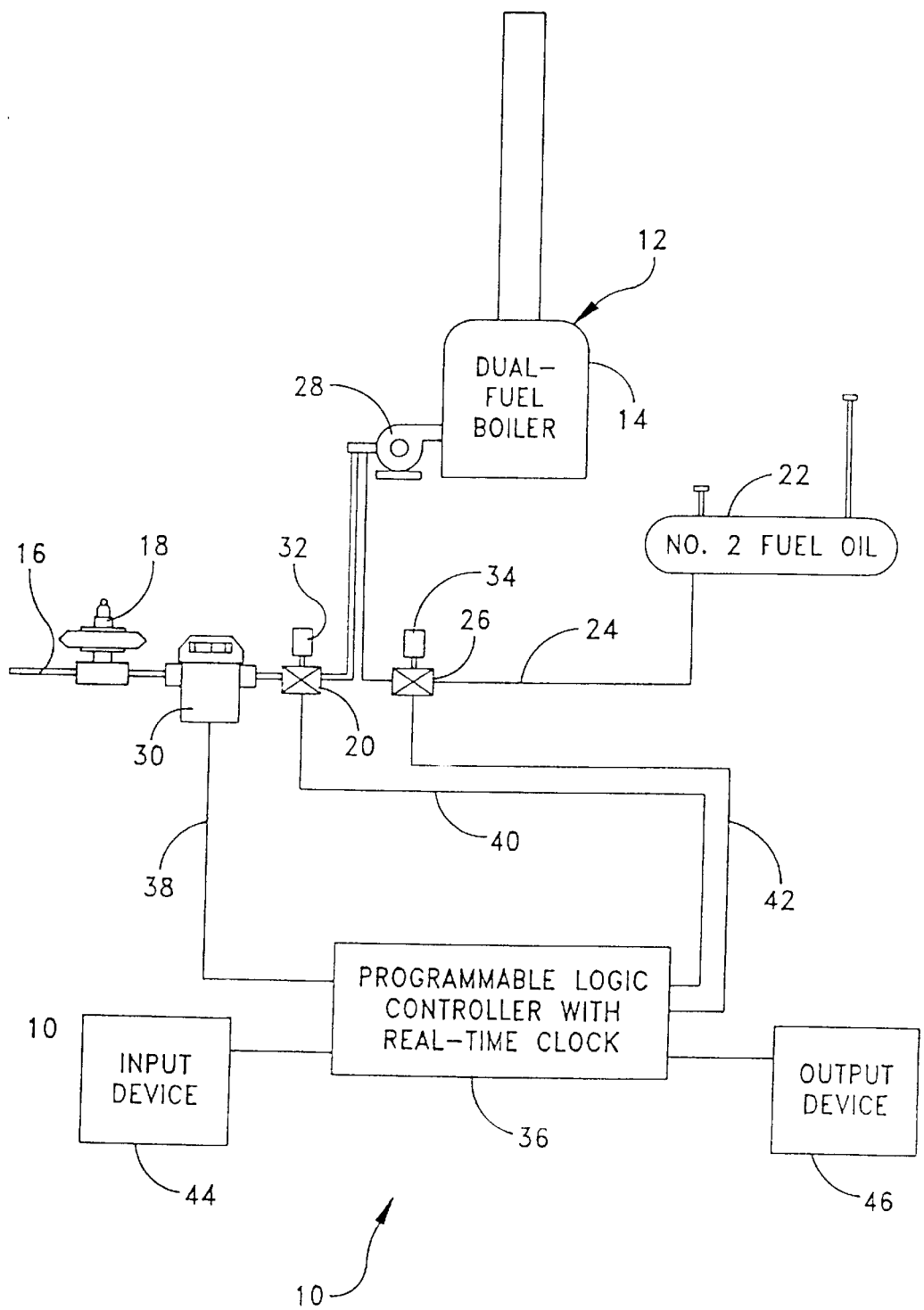
FIG. 1 is a block diagram of the present control system including a primary fuel supply, secondary fuel supply, and a dual fuel boiler.
Figure 2:
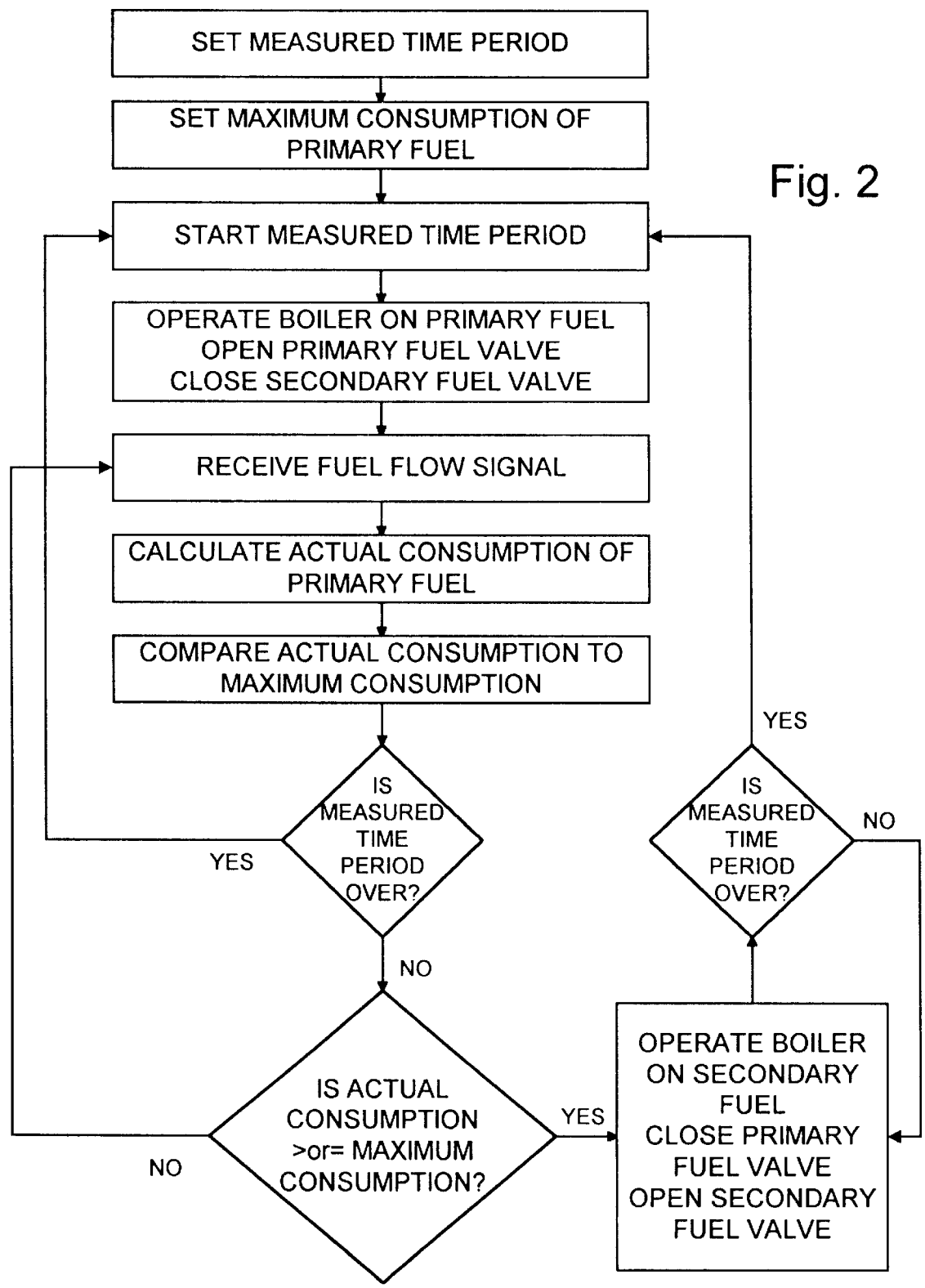
FIG. 2 is a flow chart illustrating operation of the present invention.

Referring now to the drawing, the automated control system of the instant invention is illustrated and generally indicated at 10 in the drawing figure. As will hereinafter be more fully described, the instant automated control system 10 can generally be utilized in connection with a dual-fuel apparatus generally indicated at 12, such as a dual-fuel engine or a dual-fuel steam boiler, to monitor a primary fuel source, and to switch from the primary fuel source to a secondary fuel source when a predetermined amount of the primary fuel is used in a measured period of time, thereby resulting in a 100% load factor for the primary fuel source. For purposes of the drawing figure and the present description, the dual-fuel apparatus 12 is illustrated as a dual-fuel boiler 14. However, it is to be understood that the apparatus 12 can comprise virtually any type of apparatus which is capable of consuming more than one type of fuel.

The dual-fuel boiler 14 is fueled by a primary fuel source comprising natural gas which is fed to the boiler 14 by means of a natural gas line 16. The gas line 16 includes a conventional gas regulator device 18 for regulating gas flow. The gas line 16 further includes a valve 20, such as a ball valve, for selectively controlling the flow of natural gas to the boiler 14. The dual-fuel boiler 14 is alternately fueled by a secondary fuel source comprising fuel oil which is stored in a tank 22 and fed to the boiler 14 by means of a fuel oil line 24 which includes a valve 26 for selectively controlling the flow of fuel oil to the boiler 14. During normal operation, the natural gas valve 20 is open and the fuel oil valve 26 is closed. In accordance with conventional operation, the dual-fuel boiler 14 is equipped with appropriate manifold and ignition structures 28 to deliver and ignite each of the different types of fuel.

The control system 10 generally includes a meter 30 mounted in the primary fuel line for continuously monitoring consumption of the primary fuel, remote controlled valve actuator assemblies generally indicated at 32, 34 respectively for remotely controlling actuation of the valves 20, 26, and a programmable logic controller 36 for automatically controlling the valve actuator assemblies 32, 34 responsive to consumption of the primary fuel as determined by the meter.

In connection with the present embodiment, the meter 30 comprises a gas flow meter which is operative for measuring natural gas flow and for generating a scalable pulse-train signal which is generated proportionately with gas consumption. Gas meters 30 which are effective for generating scalable pulse-train flow signals are well known in the natural gas arts for use with remote meter reading systems, and therefore the details of the present type of gas meter will not be described in detail herein.

The programmable logic controller 36 is of a type well known in the electronic arts and includes conventional memory (not shown) for storing program information, a central processor (not shown) for processing information, and a real-time clock (not shown) for controlling operation of the entire system based on predetermined time constraints. In operation, the flow signal is received by the programmable logic controller by means of line 38 whereby consumption of the primary fuel is measured against time within the logic controller 36. More specifically, the programmable logic controller 36 is programmed with a set of control parameters, including a measured time period, and a 100% load limit of fuel consumed during the given time period. The programmable logic controller 36 is thereby utilized to receive and sum over a given time period, for example 24 hours, the volume proportional pulse-train signal emitted by the gas meter 30. When the time based volume of gas has reached a predetermined load limit as preprogrammed, the flow of gas to the boiler 14 is stemmed by closing the valve 20 in the primary gas line 16, while a flow of oil is initiated by opening the valve 26 in the secondary oil line 24. Automatic closure of the valves 20, 26 is accomplished by means of the electric remotely controlled actuator assemblies 32, 34 mounted to the valves 20, 26. The actuator assemblies 32, 34 receive control signals from the logic controller 36 through respective lines 40, 42. The boiler 14 then operates on the fuel oil until a new period of measurement is initiated, or until the system 10 is manually over-ridden. The system 10 then reverts back to natural gas fuel when the new measured time period commences. More specifically, the logic controller sends control signals to the actuator assemblies 32, 34 to open the gas valve 20 and close the fuel oil valve 26.

In order to input information into the logic controller 36 and/or to provide the ability to change control parameters, or manually over-ride the system, an input device 44, such as a keyboard input, is connected to the logic controller 35. Likewise, in order to display set control parameters, or other vital control information for viewing, an output device 46, such as an LCD display screen, is also connected to the logic controller 36. Programming of the logic controller 36 for operation in accordance with the described functions is accomplished according to conventional and well known programming techniques and therefore the details of the program information will not be described in detail herein.

It is contemplated within the scope of the invention, that communication between the meter 30, and logic controller 36 and between the logic controller 36 and the remotely controlled valve actuators 32, 34 can alternately be accomplished by wireless communication means (not shown). In this regard, the logic controller 36 need not be located in the same building or location as that of the meter 30 and valve actuators 32, 34. Similarly, the programmable logic controller 36 can be provided with modem connections (not shown) for remote input and/or output of control information. For example, an operator of the system 10 could remotely dial into the control system 10 and over-ride the system, change control parameters from a remote location, or the system could be programmed to automatically dial out to obtain price quotations on certain types of fuels, whereby the logic controller would then calculate expected fuel costs for the system for a given time period, and automatically modify the control parameters to minimize fuel costs on a daily, weekly or monthly basis.

It can therefore be seen that instant invention is highly effective for automatically maintaining a consistent daily use of a primary fuel source. The use of a meter 30 to measure fuel consumption, remotely controlled valves 20, 26 to control fuel flow, and a logic controller 36 to sum usage over a given period of time and automatically control fuel usage now gives energy management personnel the ability to automatically measure and control fuel usage on a day to day basis without hands on monitoring. The further provision of electronic communication means provides enhanced functionality and flexibility in control of the system. For these reasons, the instant invention is believed to represent a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A control system for automatically controlling the delivery of primary and secondary fuels to a dual-fuel apparatus to substantially maintain a 100% primary fuel load factor, said control system comprising:

a first valve mounted in a primary fuel line, said first valve being actuable between a normally open position and a closed position to selectively control the flow of said primary fuel to said dual-fuel apparatus;

a fuel flow meter mounted in said primary fuel line, said fuel flow meter continuously monitoring consumption of said primary fuel and outputting a fuel flow signal representing consumption of said primary fuel;

a second valve mounted in a secondary fuel line, said second valve being actuable between a normally closed position and an open position to selectively control the flow of said secondary fuel to said dual-fuel consumption device; and a programmable control device associated with said fuel flow meter, said first valve and said second valve, said programmable control device controlling operation of said first and second valves responsive to said fuel flow signal and a set of control parameters programmed in said programmable control device, said control parameters including a repeating measured time period having a start time and an end time, and a maximum primary fuel consumption value, said programmable control device including a real time clock for measuring said measured time period, said programmable control device continuously receiving said fuel flow signal and using said fuel flow signal to continuously calculate actual primary fuel consumption beginning at said start time, said programmable control device automatically closing said first valve and opening said second valve if said actual primary fuel consumption equals or exceeds said maximum primary fuel consumption value before said end time, said programmable control device automatically opening said first valve and closing said second valve when said measured time period reaches said end time, said programmable control device continuously repeating said measured time period.

2. The control system of claim 1 wherein said first and second valves comprise remotely controlled ball valves, said programmable control device outputting a respective control signal to said first and second remotely controlled ball valves to control opening and closing of said remotely controlled ball valves.

3. The control system of claim 1 wherein said fuel flow signal is communicated to said programmable control device through a wireless communication device.

4. The control system of claim 1 wherein said fuel flow signal is communicated to said programmable control device through a wireless communication device.

5. A method of operating a control system for the automatically delivery of primary and secondary fuels to a dual-fuel apparatus to substantially maintain a 100% primary fuel load factor, said control system comprising a first valve mounted in a primary fuel line, said first valve being actuable between a normally open position and a closed position to selectively control the flow of said primary fuel to said dual-fuel apparatus, a fuel flow meter mounted in said primary fuel line, said fuel flow meter continuously monitoring consumption of said primary fuel and outputting a fuel flow signal representing consumption of said primary fuel, a second valve mounted in a secondary fuel line, said second valve being actuable between a normally closed position and an open position to selectively control the flow of said secondary fuel to said dual-fuel consumption device, and a programmable control device associated with said fuel flow meter, said first valve and said second valve, said programmable control device controlling operation of said first and second valves responsive to a set of control parameters, said method comprising the steps of:

programming a set of control parameters into said programmable control device, said control parameters including a measured time period, and a maximum consumption of said primary fuel for said measured time period;

operating said dual fuel apparatus on said primary fuel;

starting said measured time period;

continuously receiving said fuel flow signal and using said fuel flow signal to continuously calculate actual consumption of said primary fuel;

continuously comparing said actual consumption to said maximum consumption during said measured time period, and if said actual consumption of said primary fuel equals or exceeds said maximum consumption at any point during said measured time period, automatically switching operation of said dual fuel apparatus to a secondary fuel for a duration of the measured time period by automatically closing said first valve and opening said second valve;

automatically switching operation of said dual fuel apparatus back to said primary fuel at the end of said measured time period by opening said first valve and closing said second valve; and continuously repeating said measured time period, whereby a 100% load factor of said primary fuel is continuously maintained.

6. The method of claim 5 wherein said first and second valves comprise remotely controlled ball valves, and wherein said programmable control device outputs a respective control signal to said first and second remotely controlled ball valves to control opening and closing of said remotely controlled ball valves.

7. The method of claim 6 wherein said fuel flow signal is communicated to said programmable control device through a wireless communication device.

8. The method of claim 5 wherein said fuel flow signal is communicated to said programmable control device through a wireless communication device.

* * * * *